US007843802B2

(12) United States Patent
Yue et al.

(10) Patent No.: US 7,843,802 B2
(45) Date of Patent: Nov. 30, 2010

(54) METHOD FOR UPLINK MULTIUSER OFM WITH CONSTRAINED INPUTS

(75) Inventors: Guosen Yue, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 357 days.

(21) Appl. No.: 11/950,037

(22) Filed: Dec. 4, 2007

(65) Prior Publication Data

US 2008/0130672 A1    Jun. 5, 2008

Related U.S. Application Data

(60) Provisional application No. 60/868,421, filed on Dec. 4, 2006.

(51) Int. Cl.
*H04J 11/00* (2006.01)
*H04J 3/16* (2006.01)
*H04L 27/36* (2006.01)

(52) U.S. Cl. .................. 370/206; 370/208; 370/437; 375/298

(58) Field of Classification Search .................. 370/203, 370/206, 208, 229–232, 252, 431, 436, 437; 375/261, 298
See application file for complete search history.

(56) References Cited

U.S. PATENT DOCUMENTS

2006/0023745 A1* 2/2006 Koo et al. .................. 370/208
2009/0196362 A1* 8/2009 Song et al. .................. 375/260

OTHER PUBLICATIONS

Kim, K. et al., "Joint Subcarrier and Power Allocation in Uplink OFDMA Systems" IEEE Communications Letter, vol. 9, No. 6, Jun. 2005.
Li, H. et al., "An Analysis on Uplink OFDMA Optimality", Proc. of Vehicular Tech. Conf (VTC)-Spring, Melbourne, Australia, May 2006.

* cited by examiner

*Primary Examiner*—Aung S Moe
*Assistant Examiner*—Kerri M Rose
(74) *Attorney, Agent, or Firm*—Joseph Kolodka; James Bitetto

(57) ABSTRACT

A method setting a maximum number of determinations for computing power allocation responsive to allocating power among multiple users in one subchannel of an OFDM system; beginning determination of maximum sum-throughput of users in the OFDM system with a randomly generated power profile with an iteration including: i) computing a sum-throughput using a power profile; ii) keeping a previous power profile if the sum-throughput of the current power profile sum-throughput is less than the previous power profile sum-throughput; iii) finding an index of power profile that has maximum sum-throughput; and ascertaining power profiles when the iteration is complete.

10 Claims, 14 Drawing Sheets

METHOD FOR UPLINK MULTIUSER OFM WITH CONSTRAINED INPUTS

This application claims the benefit of U.S. Provisional Application No. 60/868,421, entitled "Design of Uplink Multiuser OFDM with Constrained Inputs", filed on Dec. 4, 2006, the contents of which is incorporated by reference herein.

BACKGROUND OF THE INVENTION

The present invention relates generally to wireless communications and, more particularly, to a method for uplink power allocation with subchannel allocation of multi-accessed users with constrained input, i.e., QAM signals.

In recently established standards, e.g. WiMAX, 3GPP LTE, orthogonal frequency division multiple access OFDMA has been adopted as the multiple-access solution for multiuser broadband wireless system. With OFDMA, each subchannel is exclusively assigned to only one user. With such an OFDMA solution, the interference among users is eliminated. The receiver is a simple single user receiver. One important performance measure for broadband multiuser system is the sum-capacity or sum-throughput, i.e., the total data transmission rate among all the users in the system. In that sense, the OFDMA is not a sum-throughput optimal solution.

It has been shown that OFDMA can achieve uplink sum-capacity optimum only for some channel realizations or with only a certain probability for Gaussian input. See H. Li and H. Liu, "An analysis on uplink OFDMA optimality", in Proc. Of Vehicular Tech. Conf. (VTC)-Spring, Melbourne, Australia, May 2006. The overall throughput performance is then not sum-rate optimal. In practical systems, constrained inputs, such as quadrature amplitude modulation QAM signals are employed. Then, the OFDMA suffers more sum-throughput performance loss. IT can be shown that OFDMA cannot achieve sum-rate optimum for any channel realization with constrained input.

Accordingly, there is a need multiuser OFDM scheme to replace OFDMA to improve the throughput.

SUMMARY OF THE INVENTION

In accordance with the invention, a method setting a maximum number of determinations for computing power allocation responsive to allocating power among multiple users in one subchannel of an OFDM system; beginning determination of maximum sum-throughput of users in the OFDM system with a randomly generated power profile with an iteration including: i) computing a sum-throughput using a power profile; ii) keeping a previous power profile if the sum-throughput of the current power profile sum-throughput is less than the previous power profile sum-throughput; iii) finding an index of power profile that has maximum sum-throughput; and ascertaining power profiles when the iteration is complete.

In another aspect of the invention, a method for allocating power among multiple users in one subchannel of an OFDM system includes repeatedly checking for a number of iterations a maximum sum-throughput of users in the OFDM system by i) computing a sum-throughput using a power profile, the initial power profile being a randomly generated power profile; ii) keeping a previous power profile if the sum-throughput of the current power profile sum-throughput is less than the previous power profile sum-throughput; iii) finding an index of power profile that has maximum sum-throughput; and ascertaining power profiles when the iteration is complete. The randomly generated power profile preferable includes the expression $\{P_{kn}^{(0,l)}\}$, $l=1, \ldots, N_P$, with $$\sum_{n=0}^{N-1} P_{kn}^{(0,l)} = P_k, \; P_{kn}^{(0,l)} \geq 0.,$$

the step of i) computing the sum-throughput using a power profile preferable includes $C(q,l)$ using $\{P_{kn}^{(q,l)}\}$ the step of ii) keeping a previous power profile if the sum-throughput of the current power profile sum-throughput is less than the previous power profile sum-throughput preferably includes if $C(q,l) < C(q-1,l)$: $P_{kn}^{(q,l)} = P_{kn}^{(q-1,l)}$, $C(q,l) = C(q-1,l)$, and the step iii) of finding an index of power profile that has maximum sum-throughput preferable includes $l^* = \arg\max C(q,l)$. Preferably, the step of ascertaining power profiles when the iteration is complete includes $\{P_{kn}^{(Q,l)}\}$, where Q is the maximum number of iterations.

BRIEF DESCRIPTION OF DRAWINGS

These and other advantages of the invention will be apparent to those of ordinary skill in the art by reference to the following detailed description and the accompanying drawings.

DETAILED DESCRIPTION

The inventive method provides a multiuser OFDM scheme to replace OFDMA for improving the throughput of incoming user signals. The method's design and analysis is based on a practical constrained input. Instead of assigning one user per subchannel, the method allows assigning more than one user in every subchannel. Therefore, contentions exist among users in some subchannel where more than one user is assigned. At the receivers, multiuser detection has to be applied to resolve interference. The assignment is based on the channel conditions for every link between the user and base station. The resulting sum-rate performance is much superior to OFDMA. The inventive method can be applied for both uplink and downlink OFDM applications.

Figure 1:
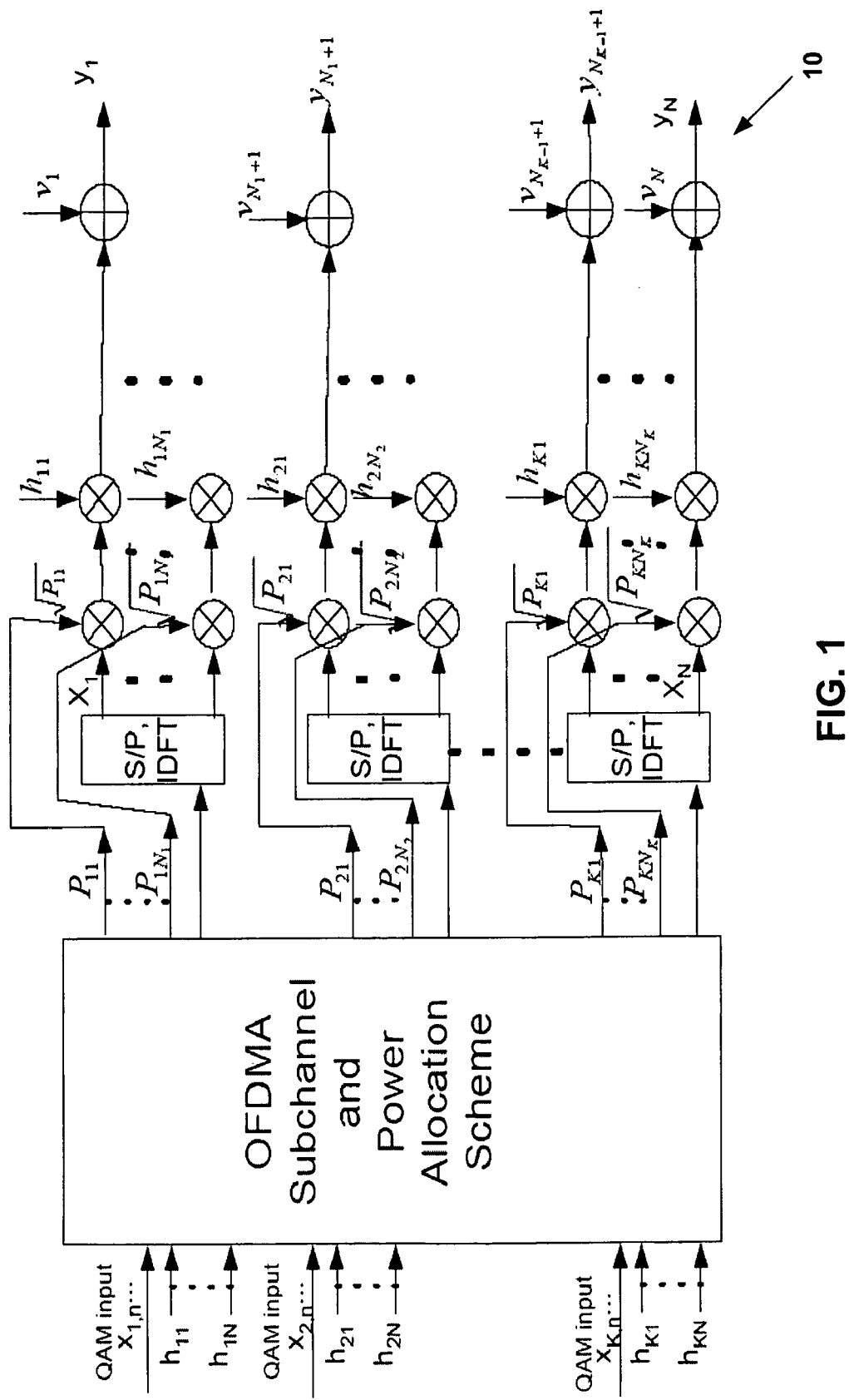
FIG. 1 is a schematic diagram of a conventional coded uplink orthogonal frequency division multiple access OFDMA system illustrating the flow path where OFDMA subchannel and power allocation is processed.
Figure 2:
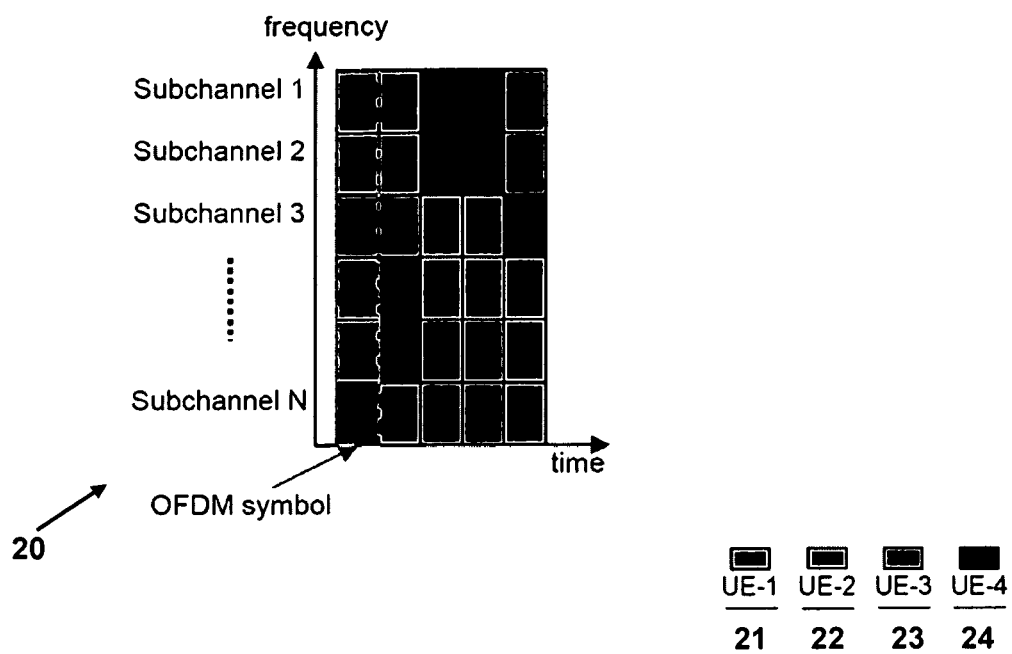
FIG. 2 illustrates the subchannel allocations with uplink OFDMA of FIG. 1.

Referring to the diagram 10 of FIG. 1, a conventional orthogonal frequency division multiple access OFDMA system 10 is shown. In the OFDMA system, each subchannel is exclusively assigned to no more than one user as shown by the diagram 20 of FIG. 2. No interleaver is added after coding, as shown in FIG. 1. Independent decoding is employed at the receiver. This scheme is not sum-rate optimal for the uplink, especially with constrained input. The power and subchannel allocation algorithm for uplink OFDMA has been studied for Gaussian input, with the sum-throughput given by $$C_{sum} = \sum_{i=1}^{K} \sum_{n=1}^{N_{sub}} \omega_{kn} \log_2\left(1 + \frac{P_{kn}|h_{kn}|^2}{N_0}\right).$$

No algorithm is given for constrained input due to difficulty on sum-throughput formation, neither for uplink multiuser OFDM allowing contentions with constrained input. A greedy algorithm is applied for OFDMA with a Gaussian input.

More specifically, the multi-access system 10 of FIG. 1 has K users. Each user transmits information using OFDM signaling with N subcarriers through a quasi-static fading channel. The received signal at the n th subcarrier is given by $$y_n = \sum_{k=1}^{K} \sqrt{P_{kn}} h_{kn} X_{kn} + v_n, n = 1, \ldots, N, \quad (1)$$

where $X_{kn}$ and $h_{kn}$ denote the transmitted symbol and the complex channel coefficient from user k at the n th subcarrier, respectively; $P_{kn}$ is the transmit power allocated to the n th subchannel from user k; $v_n$ is additive complex Gaussian noise with variance $N_0$. We denote $P_k$ as the total power for user k. We then have following per user sum power constraint, given by $$\sum_{n}^{N} P_{kn} = P_k, k = 1, \ldots, K. \quad (2)$$

We consider the slow fading channel, i.e., channel gains are constant during the power and channel allocation. We assume the receiver has perfect knowledge of channel information so that power and subchannel allocation can be performed at the receiver. Usually a group of subcarriers form one subchannel, and the channel coefficients varies among those subcarriers in the same subchannel In this work, to simplify the analysis, we assume that in the same subchannel, the fading coefficients are same for all the subcarriers in this subchannel. The system can be viewed equivalently as the one in which each subchannel contain only one subcarrier. We then have $N_{sub}=N$. In this work, we assume that the channel gains among subchannels are independent.

The receive signal in ((1)) is a general expression. For OFDMA, each subchannel is exclusively assigned to no more than one user, i.e., among the power parameters at the n th subchannel, $P_{kn}$, k=1, . . . , K, only one can be nonzero. It has been shown in the art that the OFDMA may not be optimal for the uplink multiuser OFDM. We consider the OFDM based multiple access with contentions, i.e., the subchannel allocations based on sum-throughput optimization. Hence, it is possible, one subchannel can be assigned to more than one user. Interference exists among the users that share some subchannels. In this case, joint maximum likelihood (ML) decoding has to be considered at the receiver. Since for uplink, the base station can handle much higher complexity than the mobile terminal, some multiuser detection techniques can be employed to approach optimal joint decoding. In FIG. 1, different interleavers can be employed for different users. The users signal can be separated by different interleavers similarly as interleave division multiple access (IDMA).

Sum-Throughput of Multiuser OFDM

Capacity Region of a Two-User System

Gaussian Input

We first consider the 2-user multi-access system. The capacity region for 2-user case with Gaussian inputs and superposition coding is given by $$R_1 \leq W\log_2\left(1 + \frac{P_1}{WN_0}\right), \quad (3)$$

$$R_2 \leq W\log_2\left(1 + \frac{P_2}{WN_0}\right),$$

$$R_1 + R_2 \leq W\log_2\left(1 + \frac{P_1 + P_2}{WN_0}\right),$$

where $R_i$ is the information rate for user-i, $P_i$ is the power for user-i. Here, it can be viewed as the combined power including the channel gain $|h_i|^2$. The sum capacity is defined by $C_{sum} \stackrel{\Delta}{=} \max_{R_1, R_2} R_1 + R_2$. It is seen that the optimal sum capacity or upper bound of sum-throughput for 2-user MAC is given by $$W \log_2\left(1 + \frac{P_1 + P_2}{WN_0}\right).$$

The optimal sum-throughput is achieved along the line of $$R_2 = W \log_2\left(1 + \frac{P_1 + P_2}{WN_0}\right) - R_1.$$

The capacity region of 2-user FDMA with continuous bandwidth is given by $$R_1 \leq W_1 \log_2\left(1 + \frac{P_1}{W_1 N_0}\right),$$  (4)

$$R_2 \leq (W - W_1) \log_2\left(1 + \frac{P_2}{(W - W_1) N_0}\right).$$

Figure 7:
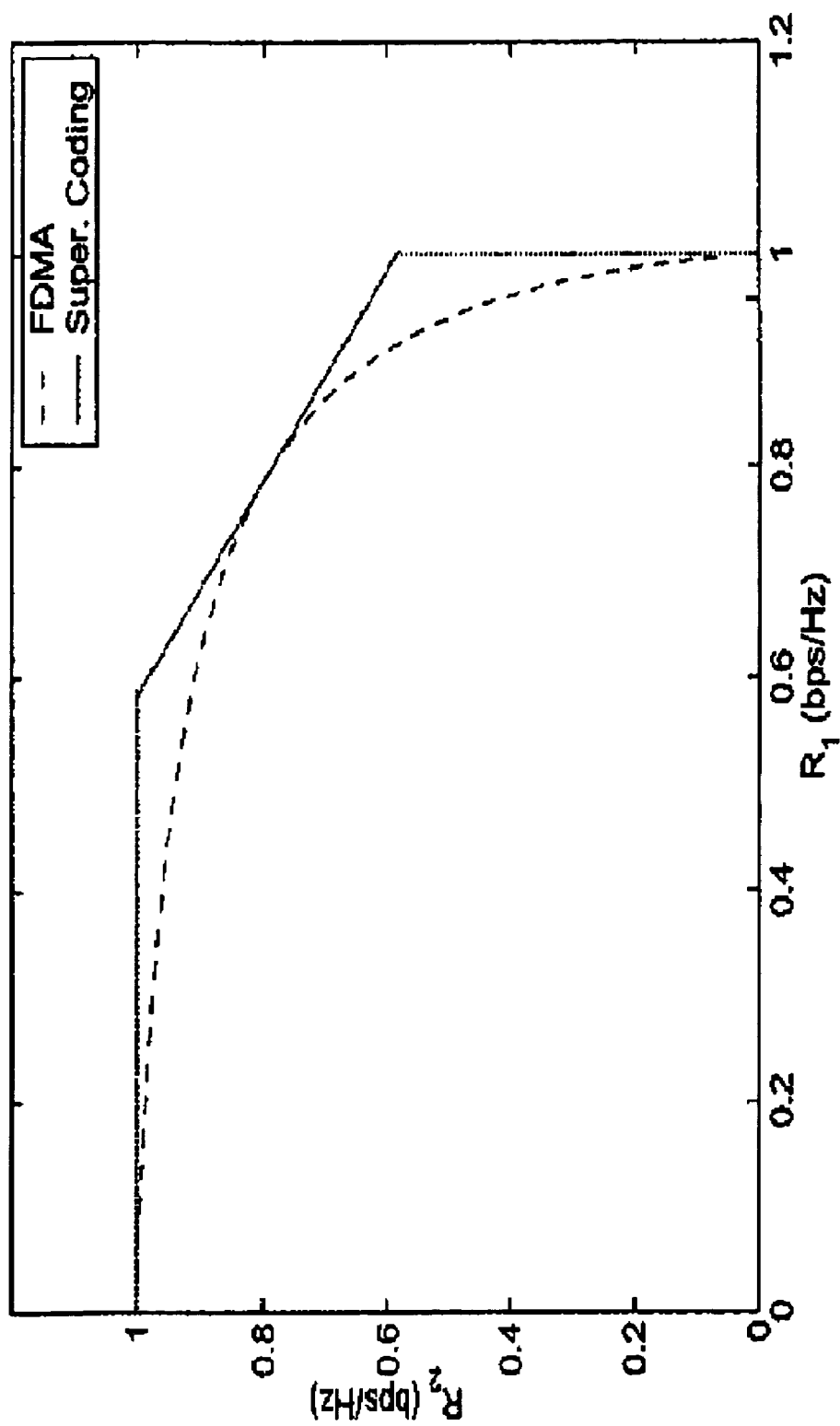
FIG. 7 is a chart of capacity regions for 2-user MAC with superposition coding and FDMA, Gaussian inputs, unit bandwidth. P1=P2=0 dB.

The capacity regions of 2-user MAC with superposition coding and FDMA for unit bandwidth, i.e., W=1, are illustrated in FIG. 7. It is seen that for the 2-user case, the superposition coding can achieve the optimal sum-throughput along the line of $$R_2 = \log_2\left(1 + \frac{P_1 + P_2}{N_0}\right) - R_1.$$

Different optimal sets of $$\left\{(R_1, R_2) \mid R_1 + R_2 = \log_2\left(1 + \frac{P_1 + P_2}{N_0}\right)\right\}$$

can be achieved by time sharing. FDMA with continuous bandwidth can achieve the optimal sum capacity, but only at one point.

Constrained Input

We first define the constrained channel capacity function $C_{cstr}(P)$. Given input constellation set, $\Omega = \{s_i, i=1, \ldots, N_c = |\Omega|\}$, we obtain the constrained capacity given by $$C_\Omega \triangleq C_{cstr}(P)$$  (5)

$$= \sum_{i=1}^{N_c} Pr(s_i) \int f(y \mid P, s_i) \log_2 \frac{f(y \mid P, s_i)}{\sum_{j=1}^{N_c} Pr(s_j) f(y \mid P, s_j)} dy,$$

where $Pr(s_i)$ is the probability of $s_i$ as the channel input; $f(y|P, s_i)$ is pdf of the channel output conditioned on channel input $s_i$ and received power P. For AWGN channel, assuming unit noise variance, we have $f(y|P, s_i)$ given by $$f(y \mid P, s_i) = \frac{1}{\pi} e^{-|y - \sqrt{P} s_i|^2}.$$  (6)

For equally probable inputs, we have $$Pr(s_i) = \frac{1}{N_c}.$$

We then obtain the capacity region for 2-user FDMA case, given by $$R_1 \leq W_1 C_{cstr}\left(\frac{P_1}{W_1 N_0}\right),$$  (7)

$$R_2 \leq (W - W_1) C_{cstr}\left(\frac{P_2}{(W - W_1) N_0}\right).$$

For 2-user MAC with superposition coding, we first need to obtain the constrained capacity function for 2-user joint inputs, given by $$C_{2u,\Omega} \triangleq C_{2u,cstr}(P_1, P_2)$$  (8)

$$= \sum_{i=1}^{N_c} \sum_{j=1}^{N_c} Pr(s_i, s_j) \int f(y \mid P_1, P_2, s_i, s_j)$$

$$\log_2 \frac{f(y \mid P_1, P_2, s_i, s_j)}{\sum_{i'=1}^{N_c} \sum_{j'=1}^{N_c} Pr(s_{i'}, s_{j'}) f(y \mid P_1, P_2, s_{i'}, s_{j'})},$$

where $f(y|P_1, P_2, s_i, s_j)$ is channel output pdf given with the constrained inputs from two users, $s_i$ and $s_j$ with power $P_1$ and $P_2$, respectively. For AWGN channel with unit noise variance, the channel output conditional pdf is given by $$f(y \mid P_1, P_2, s_i, s_j) = \frac{1}{\pi} e^{-|y - \sqrt{P_1} s_i - \sqrt{P_2} s_j|^2}.$$  (9)

For equiprobable input from both users, we have $$Pr(s_i, s_j) = \frac{1}{N_c^2}, \forall s_i, s_j \in \Omega.$$

The constrained capacity region for 2-user MAC with superposition coding is then given by $$R_1 \leq W C_{cstr}\left(\frac{P_1}{WN_0}\right),$$  (10)

$$R_2 \leq W C_{cstr}\left(\frac{P_2}{WN_0}\right),$$

$$R_1 + R_2 \leq W C_{2u,cstr}\left(\frac{P_1}{WN_0}, \frac{P_2}{WN_0}\right).$$

Figure 8:
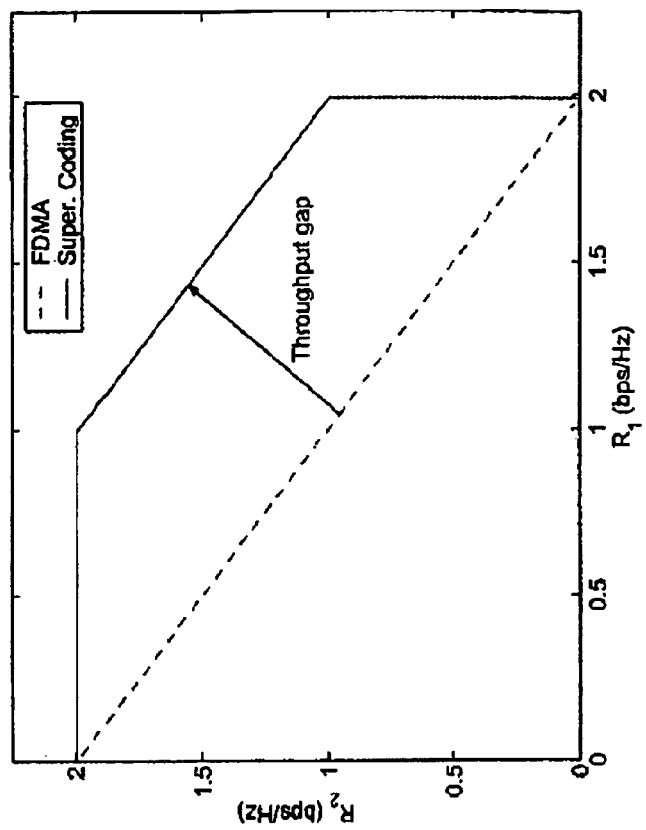
FIG. 8 is charts of capacity regions for 2-user MAC with superposition coding and FDMA, Gaussian inputs, unit bandwidth. Left P1=P2=0 dB; Right P1=P2=10 dB.
Figure 8:
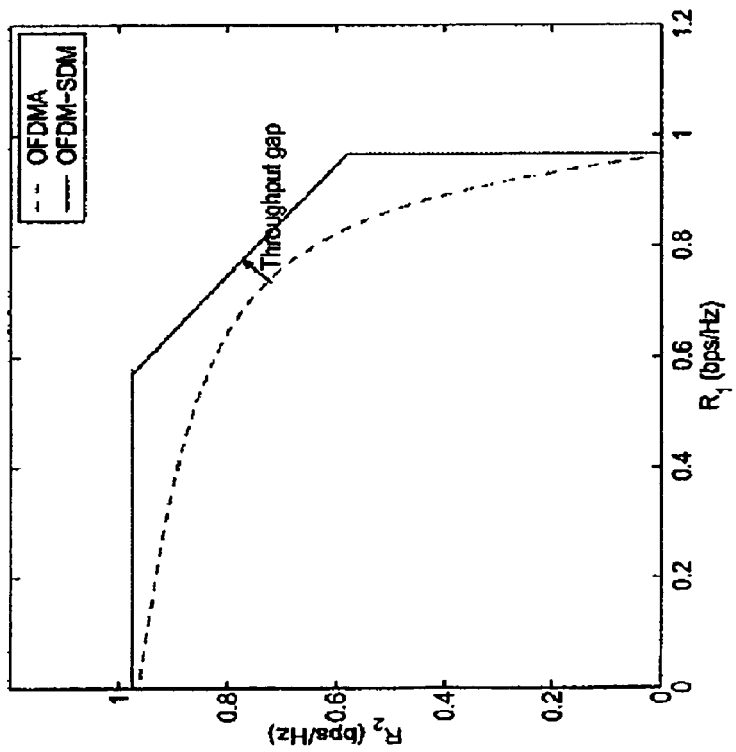

The resulting capacity regions of 2-user MAC for superposition coding and FDMA with QPSK inputs are illustrated in FIG. 8. Still, we assume unit bandwidth and unit noise variance. The left plot is for $P_1=P_2=0$ dB, and the right one is for $P_1=P_2=10$ dB. We can see that the line of $R_2=C_{2u,cstr}(P_1, P_2)-R_1$ is the optimal sum capacity of superposition coding with QPSK input. The bound of FDMA capacity region does not touch with the optimal sum capacity line for superposition coding, indicating the FDMA case can never reach sum-throughput optimum and there is a throughput loss for FDMA. In low SNR, e.g., $P_1=P_2=0$ dB, the gap between two best sum-throughput points are small. However, the gap becomes larger when SNR increases. For $P_1=P_2=10$ dB, there is a big gap between two curves, indicating a large sum-throughput loss for FDMA.

Figure 9:
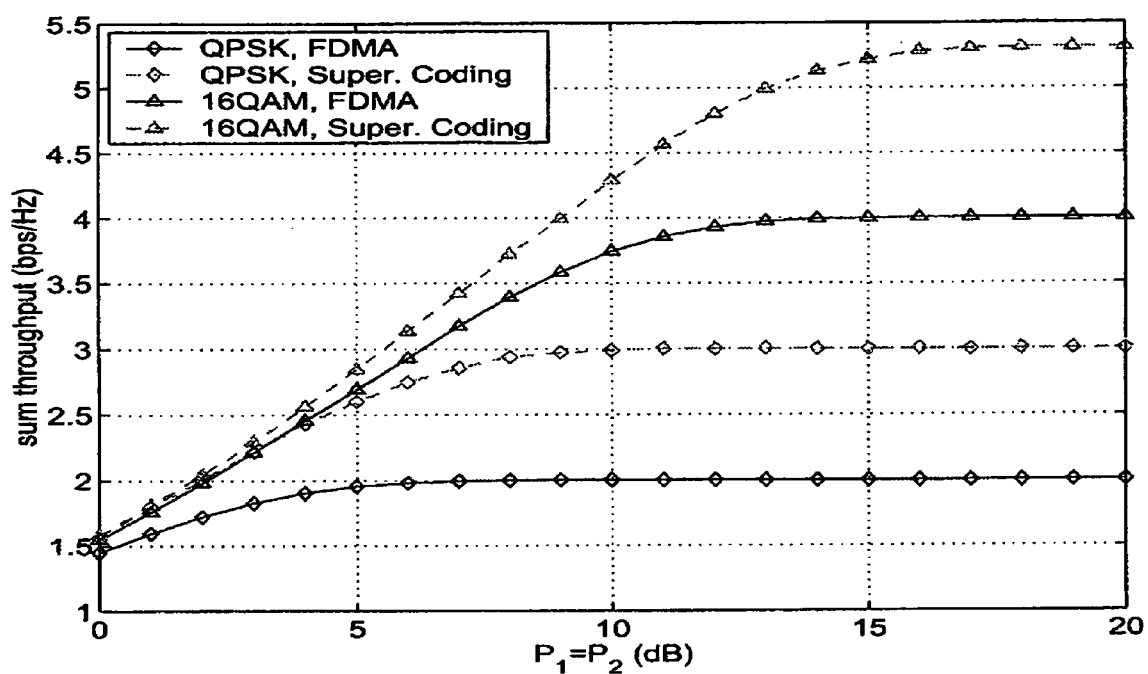
FIG. 9 is a chart of sum-throughput of 2-user MAC with superposition coding and FDMA, QPSK and 16 QAM inputs. P1=P2.

To illustrate the sum-throughput improvement by superposition coding, we show the sum-throughput of two systems with QPSK and 16QAM inputs as a function of SNR in FIG. 9. We assume $P_1=P_2$. We can see that for both QPSK and 16QAM inputs, the gap between the sum-throughput of superposition coding and FDMA increases with SNR, indicating that the sum-throughput gain of superposition coding increases with SNR. For QPSK input, the throughput gain of superposition coding is 50%. For 16QAM, the throughput gain of superposition coding decreases due to higher constellations, but there is still about 33% gain over the FDMA.

Sum Capacity for K-User MAC

It has been shown that the capacity region of K-user multiple access channel is the closure of hall of the rate vectors, $R(S)$, $S \subseteq \{1, \ldots, K\}$, satisfying $$R(S) \leq I(\{X_i\}_{i \in S}; Y | \{X_i\}_{i \notin S}). \tag{11}$$

The sum-throughput for K-user MAC with Gaussian input is upper bounded by $$\sum_{k=1}^{K} R_k \leq W \log_2 \left(1 + \frac{\sum_{k=1}^{K} P_k}{W N_0}\right). \tag{12}$$

For constrained input, we have $$\sum_{k=1}^{K} R_k \leq W C_{K-user,cstr}\left(\frac{P_1}{W N_0}, \ldots, \frac{P_K}{W N_0}\right), \tag{13}$$

where $C_{K-user,cstr}(P_1, \ldots, P_2)$ is given by $$C_{K-user,cstr}(P_1, \ldots, P_2) = \tag{14}$$

$$\sum_{i_1=1}^{N_c} \cdots \sum_{i_K=1}^{N_c} Pr(s_{i_1}, \ldots, s_{i_K}) \int f(y | P_1, \ldots, P_2, s_{i_1}, \ldots, s_{i_K})$$

$$\log_2 \frac{f(y | P_1, \ldots, P_2, s_{i_1}, \ldots, s_{i_K})}{\sum_{i_1'=1}^{N_c} \cdots \sum_{i_K'=1}^{N_c} Pr(s_{i_1'}, \ldots, s_{i_K'}) f(y | P_1, \ldots, P_2, s_{i_1'}, \ldots, s_{i_K'})}.$$

For FDMA, the capacity region for Gaussian input is given by $$R_k \leq W_k \log_2\left(1 + \frac{P_k}{W_k N_0}\right), k=1, \ldots, K. \tag{15}$$

The sum-throughput is then given by $$\sum_{k=1}^{K} R_k \leq \max \sum_k W_k \log_2\left(1 + \frac{P_k}{W_k N_0}\right), \tag{16}$$

$$\text{s.t.} \sum_{k=1}^{K} W_k = W.$$

For constrained input, we then have $$\sum_{k=1}^{K} R_k \leq \max \sum_k W_k C_{cstr}\left(\frac{P_k}{W_k N_0}\right), \tag{17}$$

$$\text{s.t.} \sum_{k=1}^{K} W_k = W,$$

where function $C_{cstr}(P)$ is given in ((5)).

Figure 10:
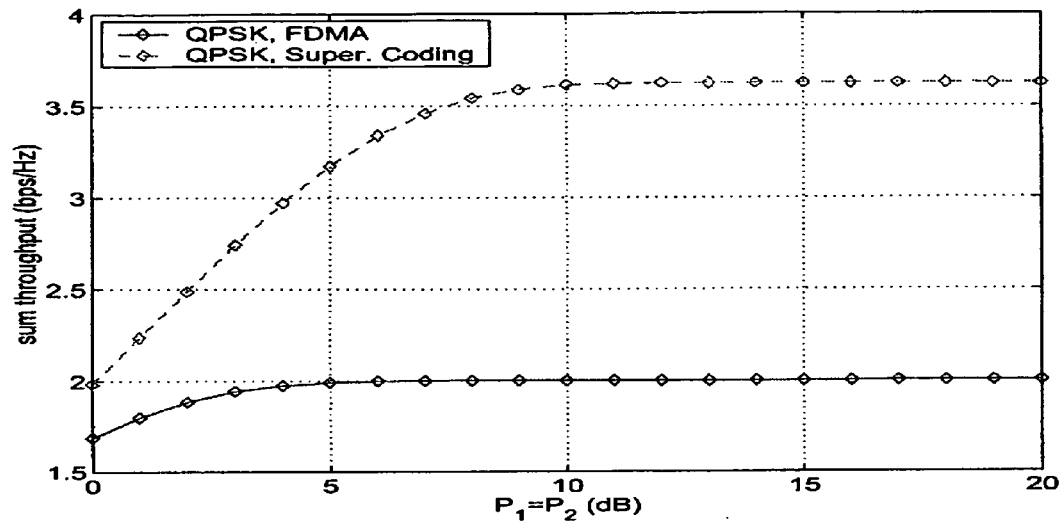
FIG. 10 is a chart of sum-throughput of 3-user MAC with superposition coding and FDMA, QPSK inputs. P1=P2.

We now compare the sum-throughput of superposition coding and FDMA for K>2. We may numerically compute the integral in ((14)) when K is small and constellation size is also small. However, if K increases it is difficult to compute it even with numerical method as the number of summations increases. It is also difficult to obtain the result from ((17)) for FDMA when K is large. The solution is provided hereinafter. We now consider the case K=3. The sum-throughput of two systems with QPSK inputs as a function of SNR in FIG. 10. We can find that the gap between the sum-throughput of superposition coding and FDMA is much larger than that of 2-user system, indicating that the sum-throughput gain of superposition coding increases with number of users. The throughput gain of superposition coding in high SNR region is 80% over the FDMA case.

Sum Capacity for K-User OFDM and OFDMA

For Gaussian input, the sum capacity of K-user OFDM system with joint decoding is given by $$C_{sum} = \sum_{n=1}^{N_{sub}} \log_2\left(1 + \frac{\sum_{k=1}^{K} P_{kn}|h_{kn}|^2}{N_0}\right). \tag{18}$$

We may use above expression for OFDMA. To facilitate the power and subchannel allocation, the following expression is known, $$C_{sum} = \sum_{k=1}^{K} \sum_{n=1}^{N_{sub}} w_{kn} \log_2\left(1 + \frac{P_{kn}|h_{kn}|^2}{N_0}\right), \tag{19}$$

where $w_{kn}$ has the value of 0 or 1, where $w_{kn}=1$ if subchannel n is assigned to user k, otherwise, $w_{kn}=0$. This parameter can relaxed to be a real number in [0,1] to make the problem tractable. However, it is difficult to obtain a simple expression for the sum capacity of multiuser OFDM with constrained input. In the next, we then provide a solution by using approximate constrained capacity.

Approximate Sum-Throughput with Constrained Input

Single Carrier Systems

Note that above study is for single carrier system, or single frequency bandwidth. Our purpose is to study the multicarrier systems. As aforementioned, it is difficult to compute the sum-throughput for K-user MAC in ((14)), not to mention obtaining the sum-throughput for a K-user OFDM system with constrained input. It is then natural to simplify the constrained capacity expression in ((14)), as well as the sum capacity of multi-user OFDM.

The single-user Gaussian channel capacity as a function of SNR with BPSK input can be approximated by an exponential function of the form $f(SNR)=1-e^{-bSNR}$. It is known that the approximate Gaussian channel capacity functions for higher constellations are generalized and given by $$f_m(SNR)=a_m(1-e^{-b_m SNR}), \qquad (20)$$

where $a_m$, $b_m$ are the approximate parameters for different constellations. We now adopt the same manner to approximate the sum capacity of multiple access system in AWGN channel with constrained input.

We first recap the approximation results for single-user Gaussian channel capacity. The parameter sets for several constellations are shown in the Table below.

|       | BPSK  | QPSK  | 16 QAM |
|-------|-------|-------|--------|
| $a_m$ | 1     | 2     | 4      |
| $b_m$ | 1.235 | 0.657 | 0.202  |

Figure 11:
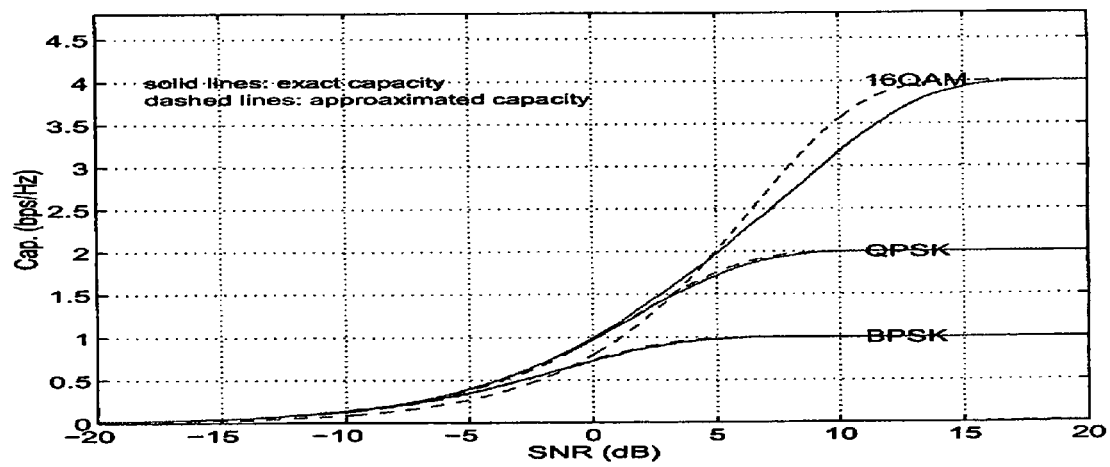
FIG. 11 is a chart of constrained AWGN channel capacity with BPSK, QPSK or 16 QAM inputs.

The approximate capacity results and exact capacity for BPSK, QPSK, 16QAM are shown in FIG. 11. It is seen the approximation is fairly well, especially for BPSK, QPSK. For 16QAM, there is a little mismatch. It can be improved by introducing more parameters as $$f_m(SNR) = \sum_i a_{m,i}(1 - e^{-b_{m,i} SNR}). \qquad (21)$$

With the above approximations, we first obtain the sum capacity function of K-user MAC in single carrier system. To obtain the constrained sum capacity, we have two remarks as follows. First, for Gaussian inputs, although the interference from other users is not Gaussian distributed, we assume the interference plus noise is Gaussian distributed. Secondly, we assume successive interference cancellation (SIC) is employed at the receiver. It is well known that with time-sharing, the SIC can achieve uplink AWGN sum capacity. With these assumptions, we now obtain the approximate sum-throughput for single carrier K-user MAC, given by $$\eta_{sum} \approx \sum_{k=1}^{K} a_m \left(1 - e^{-\frac{b_m P_k}{N_0 + \sum_{j=1}^{k-1} P_k}}\right), \qquad (22)$$

where we assume the SIC decoding order is K, K−1, ..., 1. Since for constrained input, with above approximations, the order of the SIC may incur different results, we then obtain the approximate sum capacity as follows $$\hat{C}_{sum} \approx \max_{\forall \, order k' \in \{1, \ldots, K\}} \sum_{k'} a_m \left(1 - e^{-\frac{b_m P'_k}{N_0 + \sum_{j=1}^{k-1} P'_k}}\right). \qquad (23)$$

Figure 12:
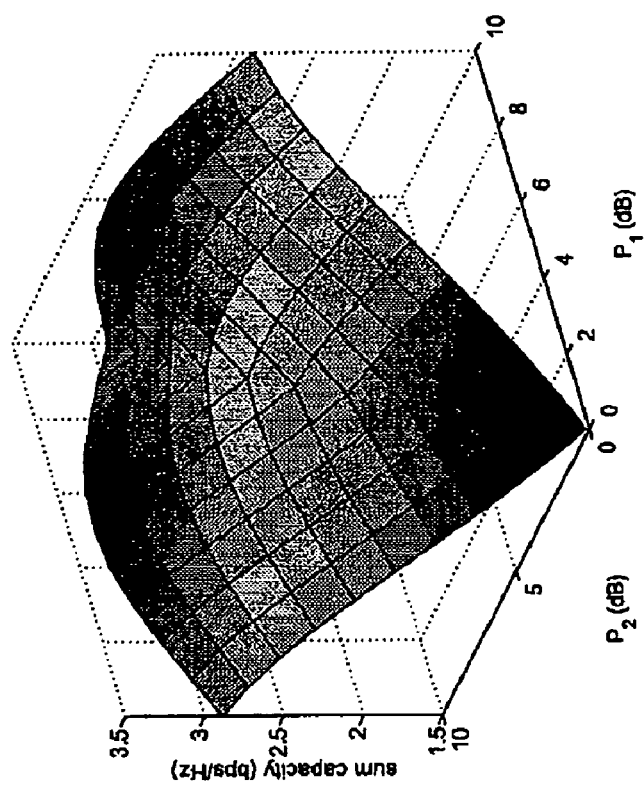
FIG. 12 is graphs of sum capacity for 2-user MAC with superposition coding, QPSK inputs. Left: exact sum capacity; Right: approximate sum capacity.
Figure 12:
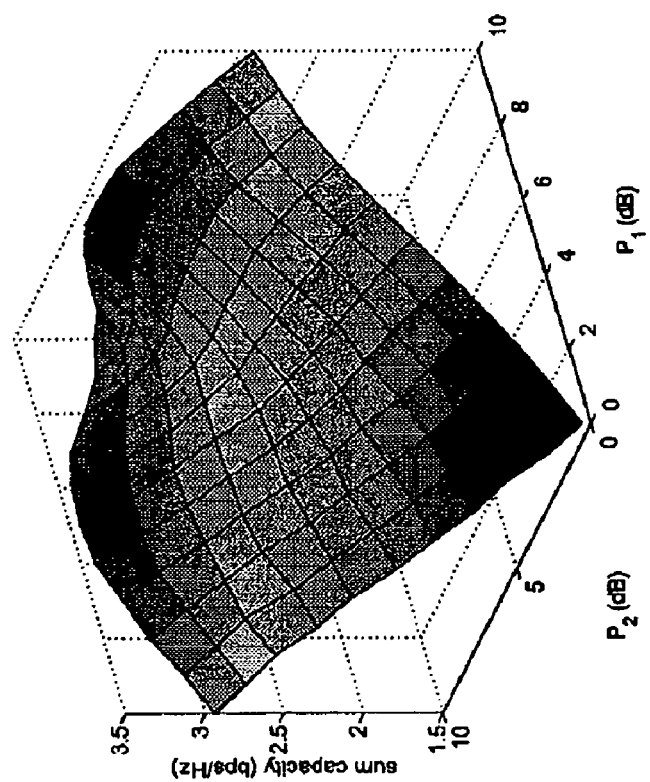

We now evaluate the approximate sum capacity. We consider a 2-user system since we can obtain exact sum capacity. The results are illustrated in FIG. 12. We consider QPSK modulation. The left plot shows the exact sum capacity of 2-user MAC with QPSK input for different power input ($P_1$, $P_2$). The right one shows the approximate results. We find that the approximate sum capacity matches with the exact sum capacity. The resulting mean square error (MSE) for the approximation in FIG. 12 is only about 0.002.

It should be noted that in (23), the sum capacity is obtained by maximizing the throughput for all possible permutated orders of SIC. For K>3, the computational complexity increases dramatically. Based on the central limit theorem, when K increase, the interference becomes Gaussian like. So does the noise plus the interference. Therefore, for large K, we can use the sum-throughput with any order of SIC, for instance, $\hat{C}_{sum} \approx \eta_{sum}$.

Multicarrier Systems

For multicarrier systems, with approximate constrained capacity function in (20), it is straightforward to obtain the constrained sum-throughput of OFDMA system. We can simply replace the Gaussian capacity in (19) with the approximate constrained capacity, given by $$C_{sum} \approx \sum_{k=1}^{K} \sum_{n=1}^{N_{sub}} w_{kn} a_m \left(1 - e^{-\frac{b_m P_{kn} |h_{kn}|^2}{N_0}}\right). \qquad (24)$$

For contention based uplink OFDM, we obtain the approximate sum capacity given by $$C_{sum} \approx \sum_{k=1}^{K} \sum_{n=1}^{N_{sub}} a_m \left(1 - e^{-\frac{b_m P_{kn} |h_{kn}|^2}{N_0 + \sum_{j<k} P_{jn} |h_{jn}|^2}}\right). \qquad (25)$$

Power and Subchannel Allocations

Sum-Throughput Optimization

After define the sum capacity, based on the received channel information from each user in the system, it is necessary to perform the power and subchannel allocations to maximize sum-throughput. Therefore, the power and subchannel allocations for OFDMA or contention based OFDM with superposition coding can be summarized as the following optimization problem: Given the channel realizations, maximize the sum-throughput with per user power constraint, i.e., $$\max_{\{P_{kn}\}} C_{sum} \text{ s.t.} \sum_n P_{kn} \leq P_k, P_{kn} \geq 0. \quad (26)$$

For Gaussian input, the sum capacity $C_{sum}$ in above optimization problem is replaced by the expression in (19) and (18) for OFDMA and contention based OFDM, respectively. For constrained input, $C_{sum}$ is replaced by the expression in (24) and (25), respectively.

Although we can form the optimization with a simple form for all four case, solving the optimization is not a trivial task, especially for the systems with large number of users and/or large number of subchannels. The straightforward solution usually has large or infeasible computational complexity. For instance, for OFDMA, the optimization problem can be solved by full enumeration of subchannel allocations followed by the power allocation for each user using water-filling method based on allocated subchannels. The subchannel allocation can be translated to a simple two-band partition and the power allocation becomes multiuser water-filling. However, this works only for the case when channel-gain-to-noise ratios are equal for the two users. The solution for general fading realizations is not revealed. A greedy suboptimal algorithm can then be proposed for OFDMA based on a marginal rate function and an iterative power allocation algorithm based on water-filling. This method enjoys low-complexity and the results are very close to that solved by full enumeration. An iterative water-filling algorithm has been proposed in the art for the contention based multiuser system. But it is for Gaussian input and the art only consider the independent decoding at the receiver. We next provide some low-complexity solutions for OFDMA and contention based uplink OFDM with constrained input.

Low-Complexity Method

Based on a known method we then form a greedy process using the approximate constrained capacity given in (24). The proposed greedy process for joint power and subchannel allocations for OFDMA with constrained inputs is summarized as follows.

Process 1 [Greedy joint power and subchannel allocations for OFDMA with constrained inputs]

Initializations: set $U_k = \emptyset$, $k=1, \ldots, K$, where $U_k$ denotes the set of subchannels allocated to user k. Set $V = \{1, \ldots, N_{sub}\}$.

Let $U'_k = \{V, U_k\}$, $k=1, \ldots, K$. Compute the power allocation $P_{kn}$ for user k using water-filling algorithm for any $n \in U'_k$, i.e., $$P_{kn} = \frac{1}{b_m |h_{kn}|^2} \left( \lambda_k - \log\left(\frac{1}{a_m b_m |h_{kn}|^2}\right) \right)^+, n \in U'_k, \quad (27)$$

for $k = 1, \ldots, K$.

Choose the pair $(k^*, n^*) = \arg \max_{(k,n)} P_{kn} |h_{kn}|^2$. Assign subchannel $n^*$ to user $k^*$, i.e., $U_{k^*} \leftarrow \{n^*, U_{k^*}\}$. Set $V \leftarrow V/n^*$.

Repeat above step (2) and (3) until all the subchannels are allocated, i.e., $V = \emptyset$.

For contention based uplink OFDM, it is not easy to form a low-complexity process to solve the optimization in (26) with constrained input. We propose an efficient method to obtain good power profiles so that the sum-throughput is close to optimum. The proposed generic algorithm is based on a differential evolution method. The differential evolution method has been successfully applied to the optimization of irregular LDPC code ensemble profiles. The resulting optimized LDPC codes can approach channel capacity threshold within only several tenth decibel or even less. We now adopt a differential method to obtain the power profiles for contention based uplink OFDM. The process is summarized as follows.

Process 2 [Iterative power allocation for contention-based uplink multiuser OFDM]

Initializations:

Randomly generate a set of $N_P$ power profiles, $\{P_{kn}^{(0,l)}\}$, $l=1, \ldots, N_P$. The power profiles satisfy the following constraints:

$$\sum_{n=0}^{N-1} P_{kn}^{(0,l)} = P_k, P_{kn}^{(0,l)} \geq 0. \quad (28)$$

Set maximum number of iterations Q.

For $q=0, \ldots, Q$:

Compute sum-throughput $C(q,l)$ using $\{P_{kn}^{(q,l)}\}$ from (25) and obtain $$l^* = \arg \max_l C(q, l). \quad (29)$$

Power profile mutations:

Update $N_P$ power profiles by $$P_{kn}^{(q+1,l)} = P_{kn}^{(q,l^*)} + 0.5(P_{kn}^{(q,\Delta_1)} - P_{kn}^{(q,\Delta_2)} + P_{kn}^{(q,\Delta_3)} - P_{kn}^{(q,\Delta_4)}), \quad (30)$$

for $k=1, \ldots, K$; $n=1, \ldots, N-1$, where $\Delta_i$, $i=1, \ldots, 4$ are integers randomly chosen from $[1, \ldots, N_P]$. If $P_{kn}^{(q+1,l)} < 0$, set $P_{kn}^{(q+1,l)} = 0$. Then compute $$P_{kN}^{(q+1,l)} = P_k - \sum_{n=1}^{N-1} P_{kn}^{(q+1,l)}. \quad (31)$$

Compute $C(q+1,l)$ using power profile $\{P_{kn}^{(q+1,l)}\}$. If $C(q+1,l) < C(q,l)$, set $P_{kn}^{(q+1,l)} = P_{kn}^{(q,l)}$ for all k, n.

The final output power profiles are given by $$P^*_{kn} = P_{kn}^{(Q,l^*)}, k=1, \ldots, K; n=1, \ldots, N, \quad (32)$$

where $l^* = \arg \max_l C(Q,l)$.

Numerical Results

Sum-Throughput of Two-User Uplink Systems

We first compare the sum-throughput performance of OFDMA and contention based uplink OFDM with optimal power and subchannel allocations. SIC decoding is assumed. Then we present the throughput results using low-complexity sub-optimal power and subchannel allocation algorithms.

Power and Subchannel Allocation

Figure 13:
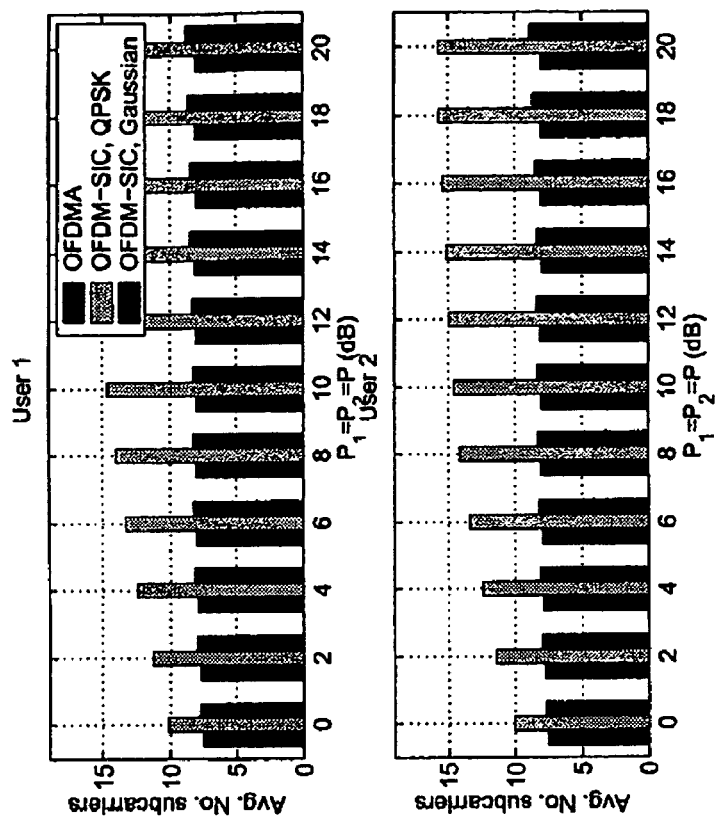
FIG. 13 is graphs of sum-capacity for 2-user MAC with optimal power and subchannel allocations, QPSK inputs. Left: sum-throughput; Right: average number of subchannels allocated to each user. K=2, Nsub=16.
Figure 13:
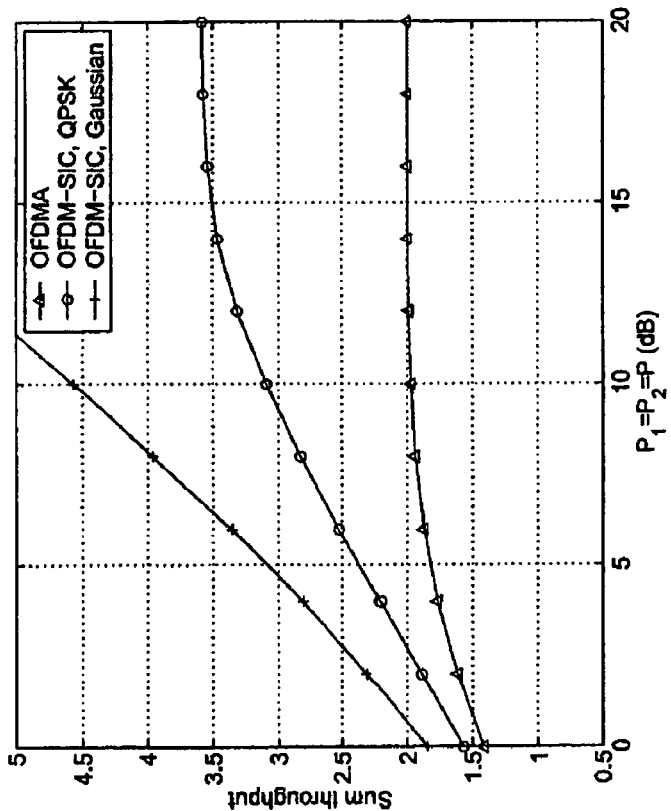

The sum-throughput of OFDMA with QPSK input and contention based OFDM (denoted by "OFDM-SIC") with QPSK input and Gaussian input is illustrated in left plot of FIG. 13. The number of subchannels available is $N_{sub} = 16$. We assume the channel gains are independent complex Gaussian random variable with unit variance. The optimal power allocations for contention based OFDM with Gaussian and QPSK input are obtained by solving the optimization problem in (26) using the nonlinear optimization packages. The joint power and subchannel allocation for OFDMA is solved by a known algorithm, but performing the water-filling using approximated constrained capacity function in (20) instead. The sum-throughput is averaged over the number of subchannels. It is seen that from left plot of FIG. 13, OFDM-SIC provides large sum-throughput gain over the OFDMA. In high SNR region, the sum-throughput performance of QPSK inputs for both systems is saturated. sum-throughput of OFDMA is saturated at 2 which is the QPSK single user single carrier capacity at high SNR's. The gain of OFDM-SIC is about 76% over OFDMA. The results are much different from those with Gaussian inputs, demonstrating that results from Gaussian input cannot represent the performance of practical system with constrained input, esp. for the uplink when the user equipment (UE) usually uses smaller constellation sizes than the base station (BS).

The average numbers of allocated subchannels for two systems are shown in the right plot of FIG. 13. It is shown that for OFDMA, the average numbers of subchannels allocated to both users are 8 for all SNR values. For OFDM-SIC with Gaussian inputs, the resulting numbers are close to that of OFDMA, especially for low SNR's, indicating that with Gaussian input, for many channel realizations, most subchannels are only allocated to one user from the optimal results. It is then possible that the optimal power and subchannel allocation results are indeed OFDMA scenarios. We will test the probability of OFDMA optimality later. For OFDM-SIC with QPSK inputs, the average number of subchannels allocated to each user is much more than 8. At high SNR's, the number of subchannels allocated to both users are 16, the total number of subchannels, indicating that from the optimal results, every subchannel should be allocated to both users. Hence, the probability of OFDMA optimality is then zero.

Figure 14:
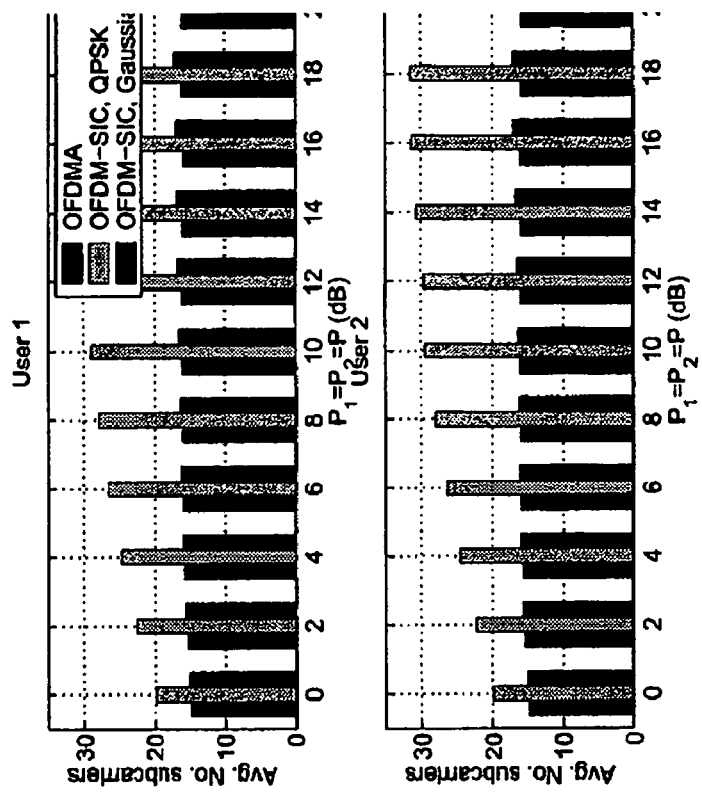
FIG. 14 is graphs of sum-capacity for 2-user MAC with optimal power and subchannel allocations, QPSK inputs. Left: sum-throughput; Right: average number of subchannels allocated to each user. K=2, Nsub=32.
Figure 14:
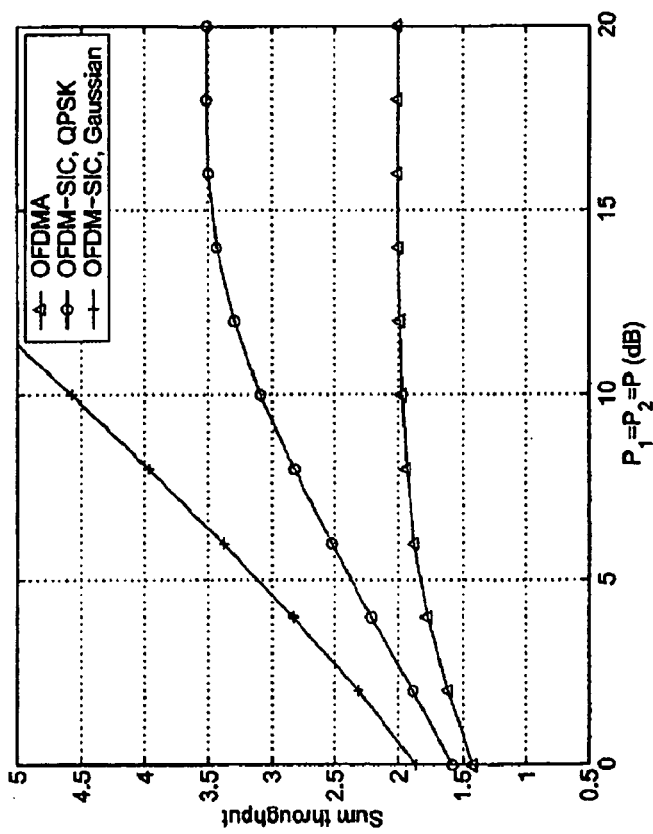

The optimal results, including sum-throughput per channel (left plot) and average number of allocated subchannels (right plot), for $N_{sub}=32$ are shown in FIG. 14. We again consider QPSK input for OFDMA, Gaussian and QPSK inputs for OFDM-SIC, the contention based uplink OFDM. We can see that the optimal sum-throughput per channel is the same as that in previous case with $N_{sub}=16$. Same throughput gain (76%) is achieved by OFDM-SIC of OFDMA with QPSK input. Similar results for average number of allocated subchannels can be found, too.

Probability of OFDMA Optimality

Figure 15:
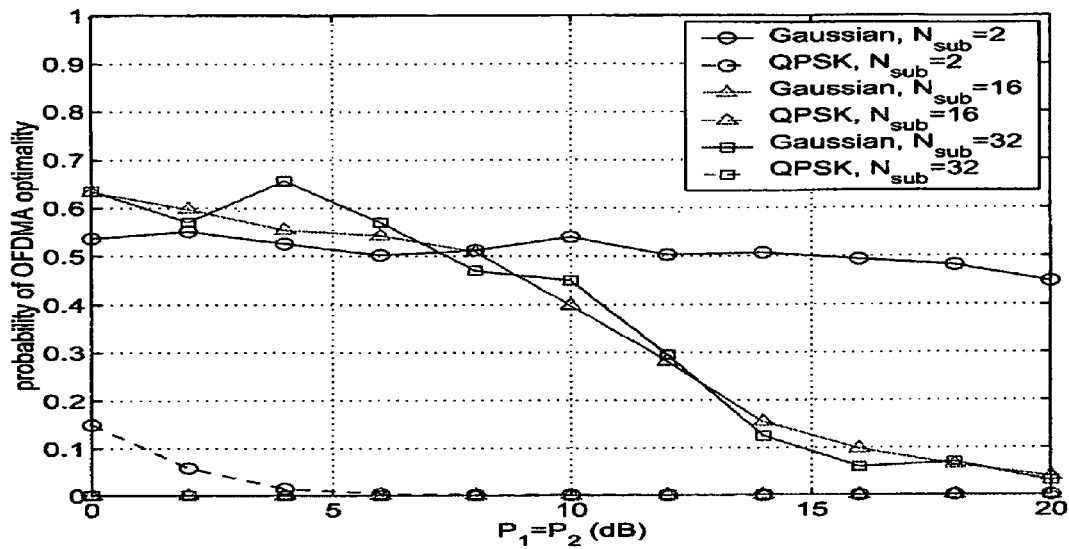
FIG. 15 is a graph of probabilities of OFDMA optimality. QPSK, K=2.

We now evaluate the probability of OFDMA optimality from optimal power allocation results for contention base uplink OFDM. For each channel realization, we obtain the optimal power and subchannel allocations. We test if the channel allocation result is indeed OFDMA. By testing many channel realizations, we then obtain the probability of resulting allocations being OFDMA actually, which is the probability of OFDMA optimality. The OFDM optimality results of Gaussian and QPSK inputs are shown in FIG. 15. We consider three cases, i.e., $N_{sub}=2$, 16, and 32, respectively. It is seen form FIG. 15, with Gaussian input, the probabilities of OFDMA optimality are not zeros for all SNR's and for all three cases. For small SNR's, the OFDMA probabilities are even greater than 50%. Then, the probability results decrease as SNR increases. When $N_{sub}=2$, the change of OFDMA probability with SNR is small. For $P_1=P_2=20$ dB, OFDMA is still 45% optimal. For $N_{sub}=16$ and 32, the OFDMA probabilities decrease sharply when $P_1=P_2>10$ dB, and reach 3% when $P_1=P_2=20$ dB. For QPSK input, we find that the probabilities of OFDMA optimality are zeros for all SNR's for $N_{sub}=16$ and 32. For $N_{sub}=2$, OFDMA is optimal only when SNR is smaller than 6 dB. For other SNR values, OFDMA is not optimal. These results show that the properties of OFDM-SIC are much different for Guassian input and constrained input and demonstrate that it is important to consider constrained input when we study and design the practical uplink constention based OFDM systems.

Low-Complexity Algorithms for Power and Subchannel Allocation

Figure 16:
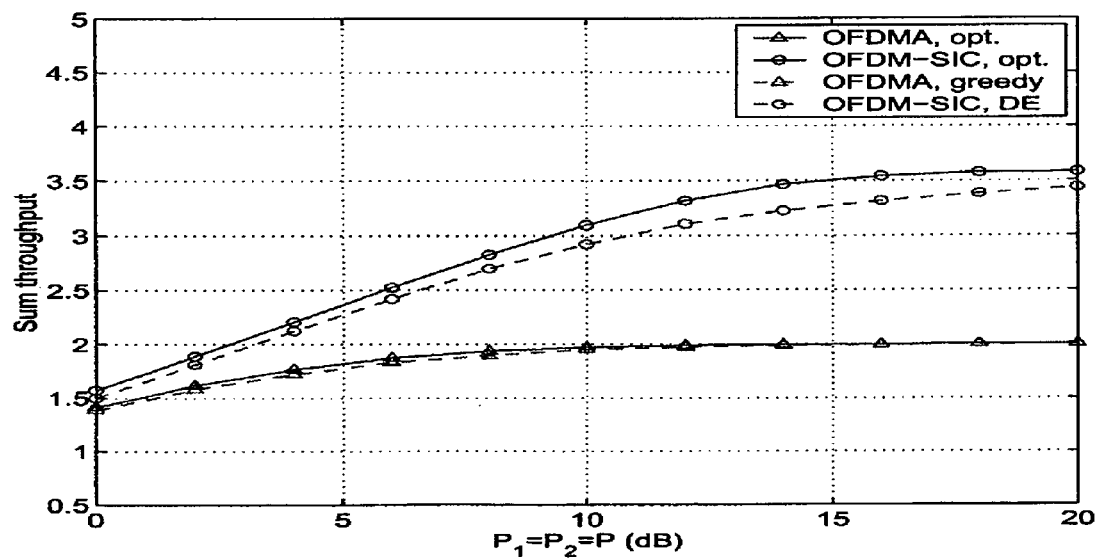
FIG. 16 is a graph of sum-throughput of OFDMA and contention based uplink OFDM, QPSK, K=2, Nsub=8.

We next consider solving the optimization problem using low-complexity algorithms presented hereinabove. Although these algorithms are practical for large number of users, we still consider a two-user system first to evaluate if there are any performance loss. The power and subchannel allocations for OFDMA are obtained from Algorithm 1 and the power allocations for OFDM-SIC are obtained from Algorithm 2, respectively. The resulting sum-throughputs from suboptimal power and subchannel allocations are illustrated in FIG. 16. The previous optimal results are also included for comparison. It is seen that for OFDMA, the low-complexity algorithm provides nearly same sum-throughput as previous results. For OFDM-SIC, the results show a little performance loss form low-complexity algorithm. However, the sum-throughput results are still very close to optimal results. Moreover, the OFDM-SIC still provides 74% sum-throughput gain over OFDMA.

Sum-Throughput of Five-User Uplink Systems

Figure 17:
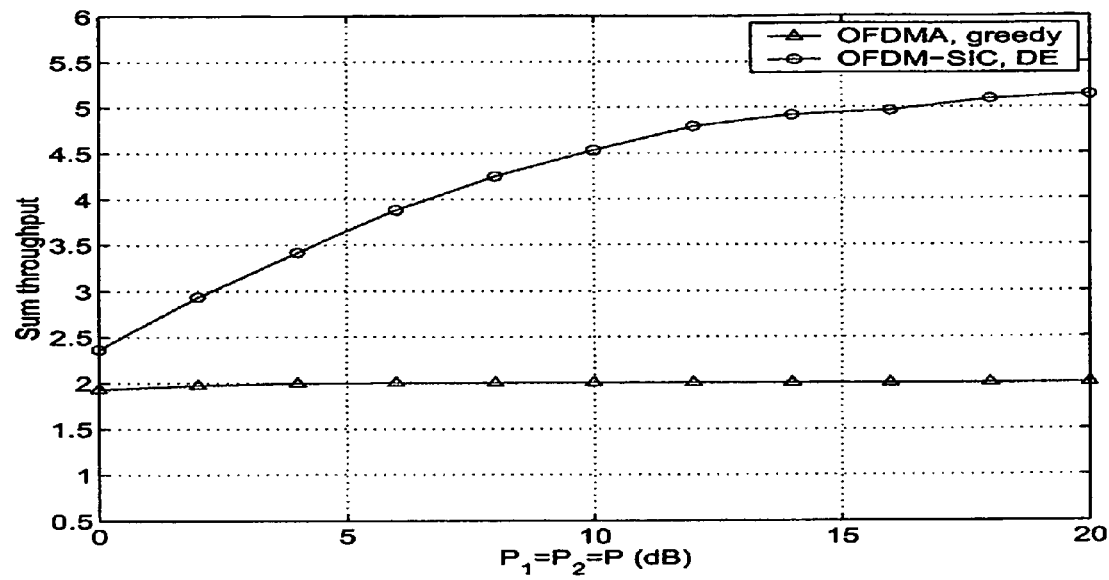
FIG. 17 is a graph of sum-throughput of OFDMA and contention based uplink OFDM, QPSK, K=5, Nsub=8.

We now consider a five-user uplink systems. Still we consider the case that the channels are independent among users and subchannels. FIG. 17 illustrates the sum-throughput performance of uplink OFDMA and OFDM-SIC with QPSK input. The sum-throughput per subchannel is computed with the power and subchannel allocations obtained from low-complexity algorithms. It is seen that again the sum-throughput of OFDMA is saturated at 2, the QPSK channel capacity at high SNR's. while the sum-throughput of OFDM-SIC is saturated at 5.2, a 150% gain over OFDMA, which is also 45% higher than sum-throughput maximum for two-user OFDM-SIC.

Figure 18:
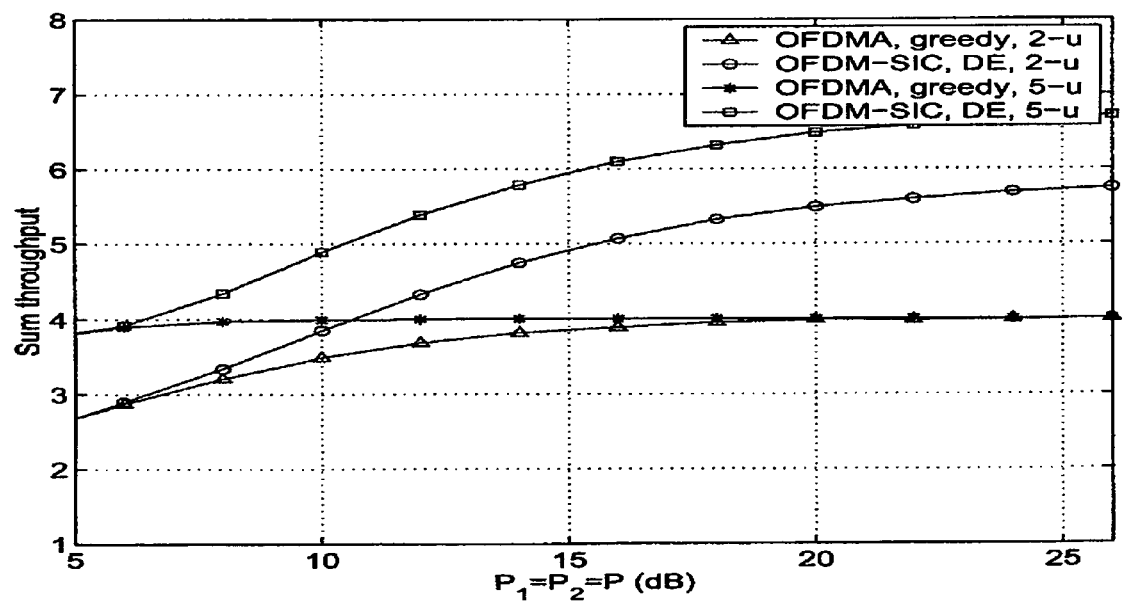
FIG. 18 is a graph of sum-throughput of OFDMA and contention based uplink OFDM, 16QAM, Nsub=8.

We now consider a higher constellation case. FIG. 18 illustrates the sum-throughput per subchannel of OFDMA and OFDM-SIC with 16QAM modulations for both 2-user and 5-user systems. Low-complexity power and subchannel allocation algorithms hereinabove are applied. We can see that the throughput gain of proposed scheme decreases for higher constellation. However, the throughput gain is still significant. For 2-user case, the throughput gain of OFDM-SIC is 44% over OFDMA as shown in FIG. 18. When K=5, the throughput gain is 68% over OFDMA.

Figure 4:
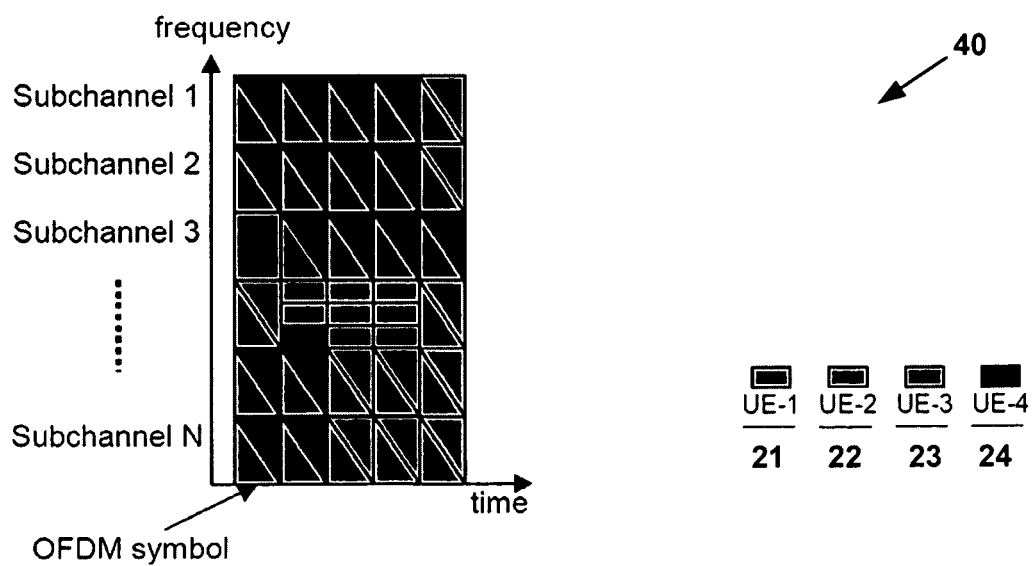
FIG. 4 illustrates the subchannel allocations with the inventive uplink multiuser OFDM, shown in FIG. 3.
Figure 3:
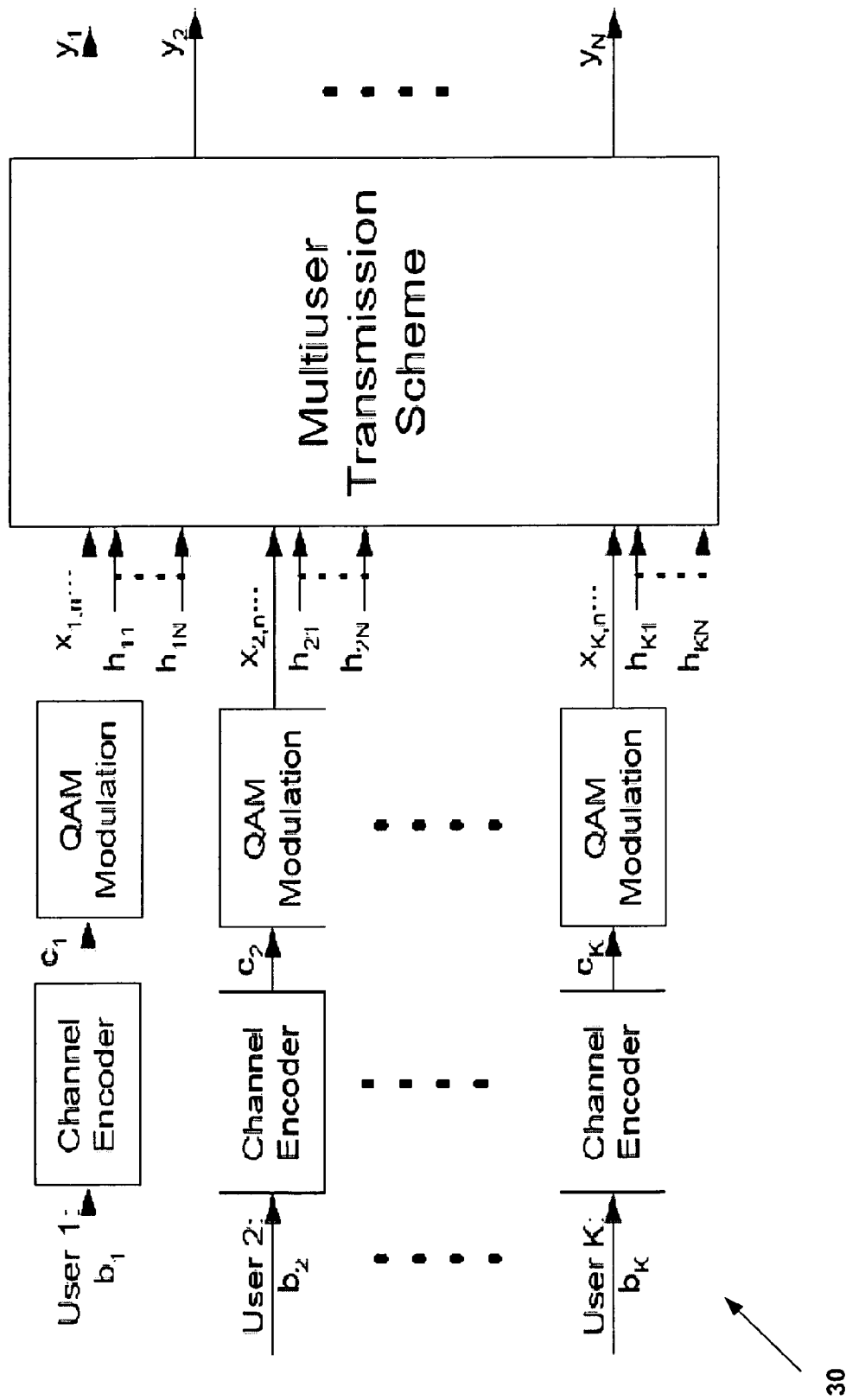
FIG. 3 is a schematic diagram of coded multiuser orthogonal frequency division multiplexing OFDM employing the inventive uplink multiuser OFDM, according to the invention.

Given the above analysis for the inventive contention based multiuser and subchannel and power allocation method, a schematic diagram of a coded multiuser OFDM according to the invention is shown in FIG. 3. The inventive method is a new multiuser transmission scheme considering practical discrete input, e.g., QAM input, as shown in FIG. 3. The associated subchannel allocations in the inventive uplink multiuser OFDM are shown in FIG. 4, in which one can allocate possibly more-than-one user in each subchannel. The detailed structure for this input is shown in FIG. 5.

Figure 5:
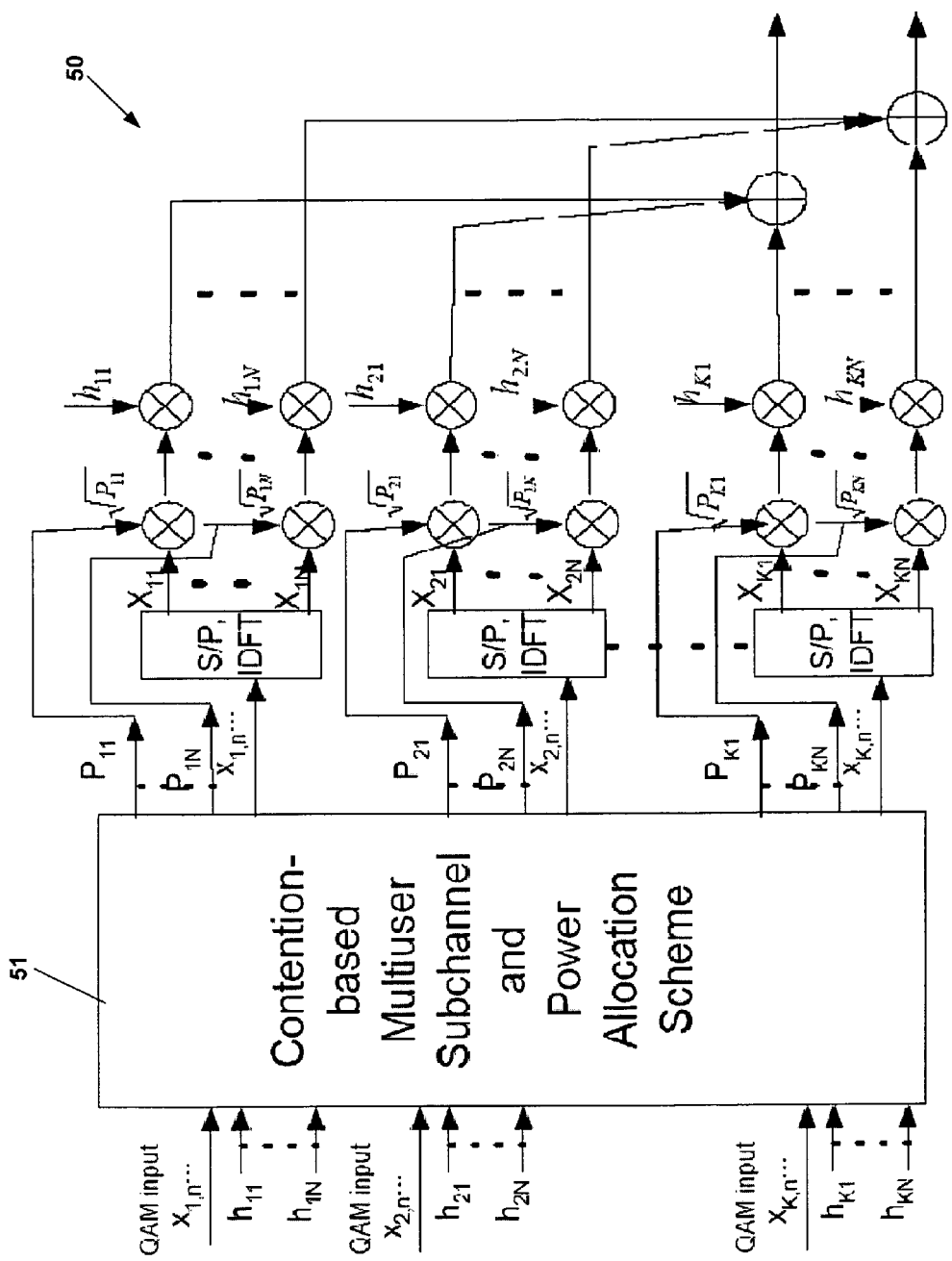
FIG. 5 is a diagram of a new multiuser transmission method for discrete input, according to the invention.

The key feature of the invention is shown in FIG. 5. The inventive method is a contention based resource allocation method for constrained/discrete inputs to improve the sum-throughput. In this method, more users can be allocated in one subchannel in OFDM system. The joint subchannel and power allocation scheme with newly defined criterion solves the important problem in this invention.

One important problem in this invention is definition of sum-throughput for multiuser OFDM system with discrete input, e.g., QAM input. The exact theoretical result is difficult to compute. Based on the approximation of QAM capacity for single carrier system, we obtain the following approximate sum-throughput considering successive multiuser detection, as discussed hereinabove, given by $$C_{sum} \approx \sum_{k=1}^{K} \sum_{n=1}^{N_{sub}} a_m \left(1 - e^{-\frac{b_m P_{kn}|h_{kn}|^2}{N_0 + \sum_{q<k} P_{jn}|h_{jn}|^2}}\right)$$

Figure 6:
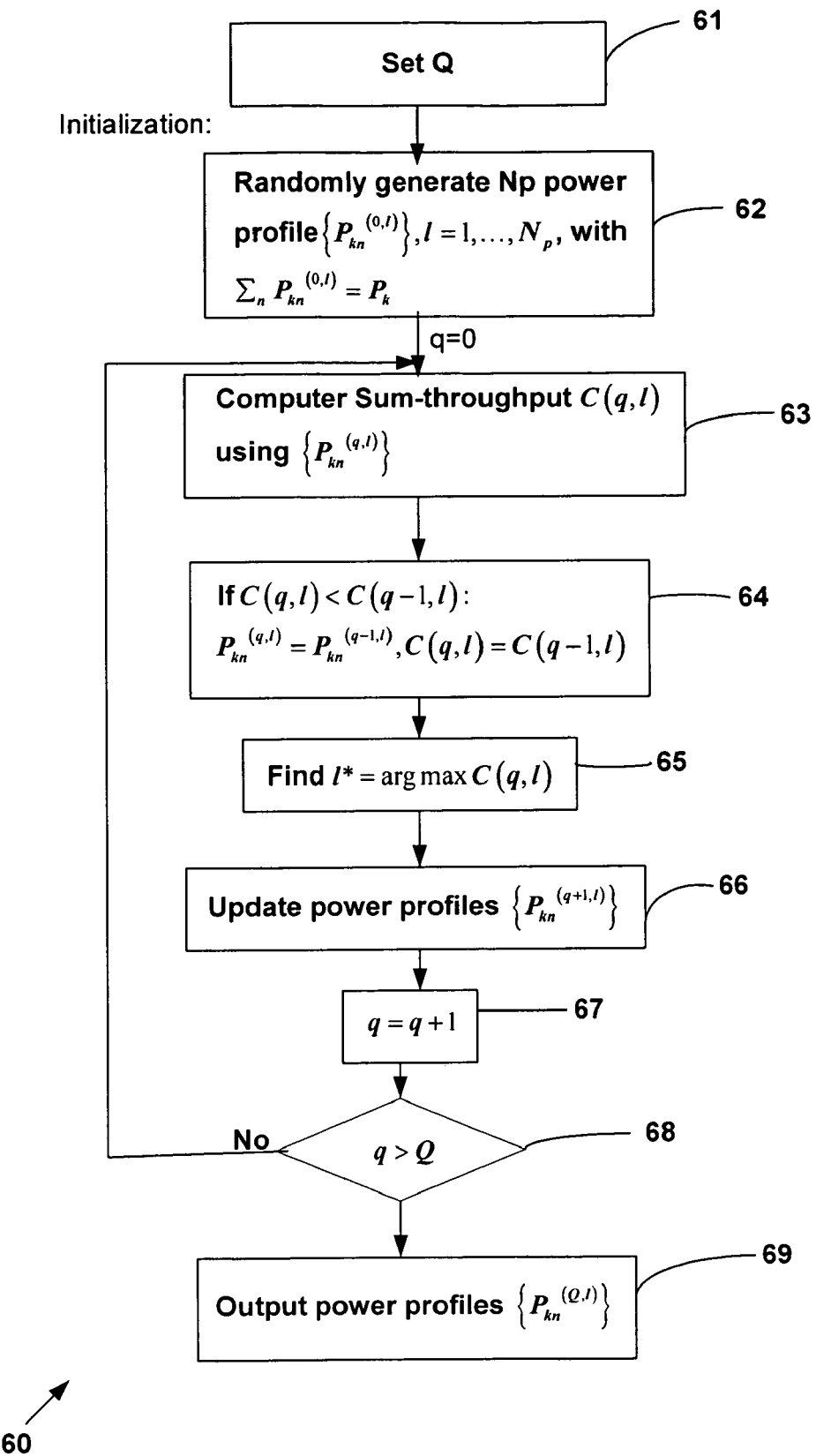
FIG. 6 is a flow chart of the multi-user transmission process according to the invention.

The method for joint power and subchannel allocation is diagrammed in FIG. 6, where the sum-throughput in every iteration C(q,l) can be computed using the above approximation. Initially, the maximum number of iterations to computer the power allocation is chosen 61 by setting Q and the power profile Np is generated 62. The maximum transmission rate for all users under consideration is computed, sum throughput C(q,l), 63. If the current power profile, sum-throughput, computed is less than the previous power profile computed then the previous power profile is used 64. The index corresponding to the power profile that has the maximum sum throughput is then found 65. The power profiles are updated in the iteration process 66. The iteration count is incremented 67. If the power profile allocations have been done enough times equal tot the maximum Q times the process repeats at block 63, otherwise the power profiles are output 69.

As can be seen from the above, the inventive method for power and subchannel allocation provides higher sum-throughput than conventional OFDMA-based multiuser systems. A simple approximate sum-throughput expression for such a system is formed, which makes the optimization problem of resource allocation attainable. A low-complexity method that is feasible at the receiver to provide the solutions of power and subchannel allocation is then provided. With the inventive method, a higher sum-throughput gain (70%) is achieved over OFDMA in a two-user uplink system. For a five-user system, the throughput gain increases to 150% over OFDMA.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method comprising the steps of:
    setting a maximum number of determinations for computing power allocation responsive to allocating power among multiple users in one subchannel of a communication device of an OFDM system with discrete quadrature amplitude modulation QAM inputs;
    determining maximum sum-throughput of users in the OFDM system with a randomly generated power profile with an iteration including:
        i) computing a sum-throughput using a power profile;
        ii) keeping a previous power profile if the sum-throughput of the current power profile sum-throughput is less than the previous power profile sum-throughput;
        iii) finding an index of power profile that has maximum sum-throughput; and
    ascertaining power profiles when the iteration is complete and including $\{P_{kn}^{(Q,l)}\}$, where Q is the maximum number of iterations.

2. The method of claim 1, wherein the randomly generated power profile comprises the expression $\{P_{kn}^{(0,l)}\}$, l=1, ..., $N_P$, with $$\sum_{n=0}^{N-1} P_{kn}^{(0,l)} = P_k, P_{kn}^{(0,l)} \geq 0.$$

3. The method of claim 1, wherein the step of i) computing the sum-throughput using a power profile comprises C(q,l) using $\{P_{kn}^{(q,l)}\}$.

4. The method of claim 1, wherein the step of ii) keeping a previous power profile if the sum-throughput of the current power profile sum-throughput is less than the previous power profile sum-throughput comprises if C(q,l)<C(q−1,l): $P_{kn}^{(q,l)}=P_{kn}^{(q−1,l)}$, C(q,l)=C(q−1,l).

5. The method of claim 4, wherein the step iii) of finding an index of power profile that has maximum sum-throughput comprises l*=arg max C(q,l).

6. A method, comprising the steps of:
    repeatedly checking, for a number of iterations, a maximum sum-throughput of users in an OFDM system's discrete quadrature amplitude modulation QAM inputs by:
        i) computing a sum-throughput using a power profile, the initial power profile being a randomly generated power profile;
        ii) keeping a previous power profile if the sum-throughput of the current power profile sum-throughput is less than the previous power profile sum-throughput;
        iii) finding an index of power profile that has maximum sum-throughput; and
    ascertaining power profiles when the iteration is complete and including $\{P_{kn}^{(Q,l)}\}$, where Q is the maximum number of iterations, for allocating power among multiple users in one subchannel of a communication device of the OFDM system.

7. The method of claim 6, wherein the randomly generated power profile comprises the expression $\{P_{kn}^{(0,l)}\}$, l=1, ..., $N_P$, with $$\sum_{n=0}^{N-1} P_{kn}^{(0,l)} = P_k, P_{kn}^{(0,l)} \geq 0.$$

8. The method of claim 6, wherein the step of i) computing the sum-throughput using a power profile comprises C(q,l) using $\{P_{kn}^{(q,l)}\}$.

9. The method of claim 6, wherein the step of ii) keeping a previous power profile if the sum-throughput of the current power profile sum-throughput is less than the previous power profile sum-throughput comprises if C(q,l)<C(q−1,l): $P_{kn}^{(q,l)}=P_{kn}^{(q−1,l)}$, C(q,l)=C(q−1,l).

10. The method of claim 6, wherein the step iii) of finding an index of power profile that has maximum sum-throughput comprises l*=arg max C(q,l).

* * * * *